Patented Sept. 16, 1947

2,427,506

UNITED STATES PATENT OFFICE 2,427,506

PROCESS FOR DEPOLYMERIZING ALLO-OCIMENE POLYMERS

Dorothy M. Oldroyd, Theodore R. Savich, and Leo A. Goldblatt, New Orleans, La., assignors to the United States of America, as represented by the Secretary of Agriculture No Drawing. Application September 17, 1945, Serial No. 616,954

3 Claims. (Cl. 260—677)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a process for depolymerizing polymerized allo-ocimene, especially the dimer.

Monomeric allo-ocimene, a hydrocarbon possessing the unusual structural configuration of three double bonds in double conjugation, is very reactive. It readily polymerizes spontaneously on standing or on heating at moderate temperatures. Polymerized allo-ocimene is also formed in relatively large proportions when alpha-pinene is heated above its boiling point of 156° C. for prolonged periods of time, for example, for the purpose of simultaneous isomerization of alpha-pinene to dipentene and allo-ocimene according to known processes. If shortened periods of time are used, the resulting product contains less polymers, but contains increased quantities of unchanged alpha-pinene, and the ratio of allo-ocimene to pentene is not changed significantly. Also, during fractional distillation of crude allo-ocimene to obtain the monomeric allo-ocimene, large quantities of the polymer are formed. Even if the distillation temperature is lowered by reducing pressure, considerable quantities yet result. Thus, in a typical case, a charge of 3500 grams of crude allo-ocimene subjected to careful fractional distillation for a period of 200 hours at a pressure of 20 mm. (still pot temperature about 110° C.) produced 750 grams of polymerized allo-ocimene. The loss of monomeric allo-ocimene by polymerization is thus a serious impairment in production and separation processes employing heat.

Polymerized allo-ocimene, and especially the dimer which is a rather viscous oil, is of little known use. However, the monomer which possesses the unusual structural configuration is useful as a starting material for producing many synthetic organic derivatives.

The object of the present invention is to depolymerize allo-ocimene polymers by a simple process resulting in high yields of the monomer.

In general, according to the invention, polymerized allo-ocimene is heated at a temperature above that at which monomeric allo-ocimene distills under the pressure conditions used, but below a temperature at which the polymer itself distills or decomposes into non-condensable gas, and the distillate, comprising essentially the monomer, is continuously removed during its formation by dissociation or depolymerization of the polymerized allo-ocimene. The precise preferred temperature depends somewhat upon the desired rate of production of the monomer and upon the pressure at which the depolymerization or dissociation is performed. At atmospheric pressure (760 mm.), the preferred temperature is from 240° to 350° C. Corresponding temperatures with reduced pressures (for example, temperatures from 230° to 300° C., at 400 mm. of mercury) may be used.

The following examples exhibit the invention in greater detail.

Example I

A 1400 gram portion of the polymer (obtained by spontaneous polymerization of allo-ocimene during fractional distillation of crude allo-ocimene to obtain pure monomeric allo-ocimene), having a 20° C. a density of 0.884 grams per cc. and a refractive index for the yellow sodium line of 1.523, was heated at atmospheric pressure to a temperature of 246° to 296° C. A fraction consisting largely of monomeric allo-ocimene was distilled out of the reaction mass at a rate of about 300 grams per hour and was condensed with practically no evolution of non-condensable gas (about 1 cc. of gas per 10 grams of monomeric product). Depolymerization was continued until 1060 grams of distillate boiling at a temperature of approximately 190° C. was obtained. This distillate had a density at 20° C. of 0.826 grams per cc. and a refractive index of 1.532. From this it may be observed that a very large amount of depolymerization had occurred, and by comparison with the physical constants of pure monomeric allo-ocimene (density of 0.808 and refractive index of 1.545 at 20° C.), it may be seen that the product obtained consists of about 80% monomeric allo-ocimene.

On careful fractional distillation of this product, it was found that a fraction of approximately 10% (consisting very largely of pyronenes formed by the spontaneous cyclization of allo-ocimene boiling below allo-ocimene, the latter boiling at 89° C. at 20 mm. of pressure) was obtained. A 70% fraction was recovered as pure allo-ocimene monomer. The residue of about 20% consisted of a polymer doubtless very largely formed from the polymerization of the allo-ocimene during the fractional distillation.

By raising the temperature of depolymerization to above about 350° C., the proportion of gas evolved is much larger. For example, at 356° C., 100 cc. of gas not condensable by a water-cooled condenser was obtained per 2 grams of the condensable monomer.

*Example II*

A 700 gram portion of polymer similar to that of Example I was heated at 400 mm. of mercury pressure to a temperature of 240° to 290° C., the monomeric fraction being distilled out of the reaction mass at a rate of about 300 grams per hour until a total of 645 grams of distillate was obtained. This distillate had a density at 20° C. of 0.828 grams per cc. and a refractive index for the yellow sodium line of 1.535.

On careful fractional distillation of this product, results comparable to those given in Example I were obtained.

There are four theoretical possible different forms of allo-ocimene, only two having thus far been distinguished. These two have been assigned the designations "allo-ocimene A" and "allo-ocimene B." The two forms may be differentiated by means of their physical constants, as given in the table below.

|        | Boiling Point at 20 mm. —° C. | Melting Point ° C. | $[d]_4^{20°C.}$ | $[n]_D^{20°}$ |
|--------|---|---|---|---|
| "A" form | 89.0 | −21.0 to −20.6 | 0.8060 | 1.5446 |
| "B" form | 91.0 | −35.4 to −34.0 | 0.8118 | 1.5446 |

When crude allo-ocimene, as it is normally obtained by isomerization of alpha-pinene, is purified by fractional distillation, it is generally found that the monomers obtained consist of approximately 80% to 90% of the "A" form and 10% to 20% of the "B" form. This is possibly due to the fact that the "B" form is more reactive and polymerizes more readily. It is noteworthy, therefore, that the allo-ocimene monomer produced by depolymerization of the polymer according to the present invention contains only a minor proportion (about 30%) of the "A" form.

Having thus described the invention, what is claimed is:

1. A process of producing monomeric allo-ocimene comprising depolymerizing allo-ocimene polymers and recovering the formed monomeric allo-ocimene by heating the allo-ocimene polymers at a temperature above that at which the monomeric allo-ocimene distills but below that at which the allo-ocimene polymers distill or decompose into non-condensable gases, and continuously removing the distillate which comprises essentially the formed monomeric allo-ocimene.

2. A process of producing monomeric allo-ocimene comprising depolymerizing allo-ocimene polymers and recovering the formed monomeric allo-ocimene by heating the allo-ocimene polymers at a temperature from 230° to 350° C., said temperature being above that at which the monomeric allo-ocimene distills but below that at which the allo-ocimene polymers distill or decompose into non-condensable gases, and continuously removing the distillate which comprises essentially the formed monomeric allo-ocimene.

3. A process of producing monomeric allo-ocimene comprising depolymerizing allo-ocimene polymers and recovering the formed monomeric allo-ocimene by heating the allo-ocimene polymers at atmospheric pressure and at a temperature about from 240° to 350° C., and continuously removing the distillate which comprises essentially the formed monomeric allo-ocimene.

DOROTHY M. OLDROYD.
THEODORE R. SAVICH.
LEO A. GOLDBLATT.

REFERENCES CITED

The following references are of record in the file of this patent:

UNITED STATES PATENTS

| Number | Name | Date |
|---|---|---|
| 2,325,422 | Palmer et al. | July 27, 1943 |
| 2,355,392 | Oberfell | Aug. 8, 1944 |

OTHER REFERENCES

J. A. C. S. 67, 242–5 (1945).